United States Patent
Bui et al.

(10) Patent No.: US 9,209,921 B2
(45) Date of Patent: Dec. 8, 2015

(54) INTERWORKING AGENT ADAPTED TO INTERACT BETWEEN NETWORK AND PRECISION TIME PROTOCOL ENTITIES

(75) Inventors: Dinh Thai Bui, Nozay (FR); Michel Le Pallec, Nozay (FR); Laurent Ciavaglia, Nozay (FR)

(73) Assignee: Alcatel Lucent, Boulogne-Billancourt (FR)

(*) Notice: Subject to any disclaimer, the term of this patent is extended or adjusted under 35 U.S.C. 154(b) by 272 days.

(21) Appl. No.: 13/810,271

(22) PCT Filed: Jun. 29, 2011

(86) PCT No.: PCT/EP2011/060890
§ 371 (c)(1),
(2), (4) Date: Feb. 15, 2013

(87) PCT Pub. No.: WO2012/007276
PCT Pub. Date: Jan. 19, 2012

(65) Prior Publication Data
US 2013/0235888 A1    Sep. 12, 2013

(30) Foreign Application Priority Data

Jul. 15, 2010 (EP) .................................. 10290395

(51) Int. Cl.
*H04J 3/06* (2006.01)
*H04J 3/14* (2006.01)
(Continued)

(52) U.S. Cl.
CPC ............ *H04J 3/0697* (2013.01); *H04J 3/0641* (2013.01); *H04J 3/0658* (2013.01); *H04J 3/0667* (2013.01); *H04J 3/14* (2013.01); *H04J 2203/006* (2013.01);
(Continued)

(58) Field of Classification Search
None
See application file for complete search history.

(56) References Cited

U.S. PATENT DOCUMENTS 7,649,912 B2 * 1/2010 Balasubramanian et al. 370/509
8,064,485 B1 * 11/2011 Montini et al. ............... 370/503
(Continued)

OTHER PUBLICATIONS

R. Cohen Resolute Networks Ltd.; PTP over MPLS; draft-ronc-ptp-mpls-00.txt; IETF Standard-Working-Draft, Internet Engineering Task Force, IETF, CH; Jun. 30, 2007; XP015052119; ISSN: 0000-0004.

(Continued)

*Primary Examiner* — Timothy J Weidner
(74) *Attorney, Agent, or Firm* — Patti & Malvone Law Group, LLC (57) ABSTRACT

The embodiments of the present invention refer to an interworking agent aimed at being installed in a network node comprising a Precision Time Protocol "PTP" module, said agent comprising:
a synchronization-side interface configured to
measure Precision Time Protocol "PTP" metrics for detecting a Precision Time Protocol "PTP" signal failure,
read and modify Precision Time Protocol "PTP" parameters of the Precision Time Protocol "PTP" module,
at least one network-side interface configured to
measure network metrics for selecting the optimal path for packet synchronization signals
monitor network events for detecting a network path change,
read and modify
signals exchanged with a network planning entity and, signals exchanged between network nodes at the network level in order to communicate with remote interworking agents located in other network nodes.

14 Claims, 4 Drawing Sheets

(51) Int. Cl.
 *H04L 7/00* (2006.01)
 *H04L 12/24* (2006.01)

(52) U.S. Cl.
 CPC ........... *H04L 7/0008* (2013.01); *H04L 41/0654* (2013.01)

(56) References Cited

U.S. PATENT DOCUMENTS

| | | | |
|---|---|---|---|
| 8,416,763 B1* | 4/2013 | Montini et al. | 370/350 |
| 2006/0203720 A1 | 9/2006 | Kano | |
| 2008/0225897 A1* | 9/2008 | Bryant et al. | 370/503 |
| 2008/0298398 A1* | 12/2008 | Eidson | 370/503 |
| 2009/0147806 A1* | 6/2009 | Brueckheimer | 370/503 |
| 2010/0080249 A1* | 4/2010 | Li et al. | 370/503 |
| 2010/0158051 A1* | 6/2010 | Hadzic et al. | 370/503 |
| 2011/0122775 A1* | 5/2011 | Zampetti et al. | 370/242 |
| 2011/0153869 A1* | 6/2011 | Bryant et al. | 709/248 |

OTHER PUBLICATIONS

Sven Meier et al; IEEE 1588 applied in the environment of high availability LANs; Information Sciences and Systems; 2007; CISS '07; 41st Annual Conference ON, IEEE, PI, Oct. 1, 2007; pp. 100-104; XP031161286; ISBN: 978-1-4244-1063-7.

Michel Le Pallec et al; Time and Frequency Distribution Over Packet Switched Networks; Bell Labs Technical Journal; Wiley, CA, US; vol. 14, No. 2; Jul. 1, 2009; pp. 131-153; XP001546641; ISSN: 1089-7089; DOI: DOI:10.1002/BLTJ.20377.

\* cited by examiner

INTERWORKING AGENT ADAPTED TO INTERACT BETWEEN NETWORK AND PRECISION TIME PROTOCOL ENTITIES

BACKGROUND ART

The embodiments of the present invention relate to the field of communication networks and in particular of network time distribution.

Precision Time Protocol (PTP) (also called as IEEE1588 protocol) and especially PTPv2 (release 2) appears to be a widely used protocol to distribute precise time.

In this document, the term "PTP" refers for example to PTP or to PTPv2.

As a timestamp packet protocol, PTP performance typically depends on two network parameters:

a Packet Delay Variation (PDV) which is the difference of the transmission delay of an observed packet with respect to a reference transmission delay (e.g. theoretical minimum delay)

a Delay Asymmetry which is the difference between transmission delays in the master-slave direction and in the slave-master direction.

Both parameters greatly depend on the transport network path used to convey the PTP flow.

In practice, the values of said parameters are set at the establishment of the transport network path.

However, in case of a PTP failure, there is typically no communication between PTP entities and network entities, and therefore no mechanism, at PTP level, exists allowing to trigger a protection procedure to use a protection path.

Similarly, in case of a path change at the network level (due to a transport network failure for example), there is no mechanism to inform the PTP slave clock of the new network characteristics (e.g. in term of delay asymmetry) related to the new transport network path. In order to solve this problem, some solutions of the state of the art consist on the one hand in a manual solution wherein an operator performs updates making use of different management entities, including the network and PTP management; and on the other hand in a unified management combining PTP management system and network management system.

However, the manual solution typically induces a high OPEX (operational expenditure) and a high reconfiguration time which requires stable (and therefore expensive) slave clocks. Concerning the unified management, due to its slowness (due to the numerous supervision tasks launched on it), the management server is typically not adapted for real-time procedure required in a network protection/reconfiguration context (which can lead to high recovery times). This solution is typically not scalable for a large network.

SUMMARY

Some embodiments of the present invention aim at overcoming at least some of the aforementioned drawbacks of the state of the art.

This may be achieved by an interworking agent adapted for being installed in a network node comprising a Precision Time Protocol "PTP" module, said agent comprising:

a synchronization-side interface configured to
  measure Precision Time Protocol "PTP" metrics for detecting a Precision Time Protocol "PTP" signal failure,
  read and modify Precision Time Protocol "PTP" parameters of the Precision Time Protocol "PTP" module, at least one network-side interface configured to
  measure network metrics for selecting the optimal path for packet synchronization signals
  monitor network events for detecting a network path change,
  read and modify
    signals exchanged with a network planning entity and,
    signals exchanged between network nodes at the network level in order to communicate with remote interworking agents located in other network nodes.

Therefore, means are provided to establish an interaction between network and PTP entities in the context of a protection mechanism or assistance for the distribution of a time reference.

According to another embodiment, the network planning entity is a network control plane and the signals exchanged with the network control plane comprise network control messages.

According to a further embodiment, the network control messages comprise Resource Reservation Protocol "RSVP" or its Traffic Engineering extension "RSVP-TE" signaling messages and at least one field modifiable by an interworking agent network-side interface comprises a POLICY_DATA object.

According to an additional embodiment, the network control messages are Label Distribution Protocol "LDP" messages and at least one field modifiable, by an interworking agent network-side interface, comprises an added network parameter Type Length Value "TLV" as an extension of Label Distribution Protocol "LDP".

According to another embodiment, the network planning entity is an Operation, Administration and Maintenance "OAM" Plane and the signals exchanged with the OAM plane comprise maintenance signals transmitted at the physical level or at the layer 2 level of the Open Systems Interconnection "OSI" model.

According to a further embodiment, the OAM plane comprises an Ethernet OAM functionality as referred by the IEEE 802.1 ag or IEEE 802.3 ah or ITU-T Y.1731 Recommendations.

According to an additional embodiment, the OAM plane comprises Multiprotocol Label Switching "MPLS" OAM functionality as referred for example by the RFC 5860.

According to another embodiment, the network planning entity comprises a network management plane.

According to a further embodiment, the Precision Time Protocol "PTP" metrics comprise:
  Packet Delay Variation (PDV) values and/or,
  link and Network node transit delay values and delay asymmetry values and/or,
  ITU-T G781 Quality Levels of the local equipment clock and/or,
  values identifying an IEEE 1588 V2 Transparent Clock, an IEEE 1588 V2 Boundary Clock or a physical-layer-based syntonization support such as the ITU-T synchronous Ethernet or SONET/SDH technologies.

According to an additional embodiment, the Precision Time Protocol "PTP" module comprises an IEEE 1588 V2 transparent clock or an IEEE 1588 V2 boundary clock or an IEEE 1588 V2 ordinary clock.

According to another embodiment, a Precision Time Protocol "PTP" signal failure corresponds to the degradation of the Precision Time Protocol "PTP" flow characteristics above a predefined threshold during a predefined observation duration so that the targeted synchronization performance (e.g. accuracy) cannot be achieved.

The embodiments of the present invention also refer to a network node comprising
a Precision Time Protocol "PTP" module and,
an interworking agent, said interworking agent comprising:
  a synchronization-side interface configured to
    measure Precision Time Protocol "PTP" metrics for detecting a Precision Time Protocol "PTP" signal failure,
    read and modify Precision Time Protocol "PTP" parameters of the Precision Time Protocol "PTP" module,
  at least one network-side interface configured to
    measure network metrics for selecting an optimal network path for synchronization signal,
    monitor network events for detecting a network path change,
    read and modify
      signals exchanged with a network planning entity and,
      signals exchanged between network nodes at the network level in order to communicate with remote interworking agents located in other network nodes.

The embodiments of the present invention also refer to a network comprising a plurality of nodes, at least some of said nodes comprising
a Precision Time Protocol "PTP" module and,
an interworking agent, said interworking agent comprising:
  a synchronization-side interface configured to
    measure Precision Time Protocol "PTP" metrics for detecting a Precision Time Protocol "PTP" signal failure,
    read and modify Precision Time Protocol "PTP" parameters of the Precision Time Protocol "PTP" module,
  at least one network-side interface configured to
    measure network metrics for selecting an optimal network path for packet synchronization signals,
    monitor network events for detecting a network path change,
    read and modify
      signals exchanged with a network planning entity and,
      signals exchanged between network nodes at the network level in order to communicate with remote interworking agents located in other network nodes.

The embodiments of the present invention also refer to a method for reconfiguring and supporting time distribution in a network "using" a Precision Time Protocol "PTP" using interworking agents implemented in network nodes comprising a Precision Time Protocol "PTP module, said interworking agents comprising:
  a synchronization-side interface configured to
    measure Precision Time Protocol "PTP" metrics for detecting a Precision Time Protocol "PTP" signal failure,
    read and modify Precision Time Protocol "PTP" parameters of the Precision Time Protocol "PTP" module,
  at least one network-side interface configured to
    measure network metrics for selecting the optimal path for packet synchronization signals,
    monitor network events for detecting a network path change,
    read and modify
      signals exchanged with a network planning entity and,
      signals exchanged between network nodes at the network level in order to communicate with remote interworking agents located in other network nodes
wherein,
in case of detection of a Precision Time Protocol "PTP" signal failure, signals exchanged with a network planning entity are modified to inform said network planning entity of a Precision Time Protocol "PTP" signal failure in order to trigger an automatic path change of the Precision Time Protocol "PTP" flow from the current working path to a protected path and,
in case of a detection of a path change,
signals exchanged between network nodes are modified to inform remote interworking agents located in other network nodes located along the Precision Time Protocol "PTP" time distribution chain of the new Precision Time Protocol "PTP" parameters corresponding to the protected path, said new parameters being then communicated by said remote interworking agents to their local Precision Time Protocol "PTP" module.

BRIEF DESCRIPTION OF THE DRAWINGS

Some embodiments of apparatus and equipment in accordance with embodiments of the present invention are now described, by way of example only, and with reference to the accompanying drawings, in which.

DETAILED DESCRIPTION

As used herein, the term "PTP" corresponds to the acronym Precision Time Protocol and is also called as IEEE (Institute of Electrical and Electronic Engineers) 1588;
As used herein, the term "RSVP" refers to the acronym Resource Reservation Protocol;
As used herein, the term "RSVP-TE" refers to the acronym Resource Reservation Protocol Traffic Engineering;
As used herein, the term "LDP" refers to the acronym Label Distribution Protocol;
As used herein, the term "TLV" refers to the acronym Type Length Value;
As used herein, the term "OAM" refers to the acronym Operation, Administration and Maintenance;
As used herein, the term "OSI" refers to the acronym Open Systems Interconnection;
As used herein, the term "MPLS" refers to the acronym Multiprotocol Label Switching;
As used herein, the term "PDV" refers to the acronym Packet Delay Variation;

As used herein, the term "ITU" refers to the acronym International Telecommunication Union;

As used herein, the term "SONET" refers to the acronym Synchronous Optical Networking;

As used herein, the term "SDH" refers to the acronym Synchronous Digital Hierarchy;

As used herein, the term "RFC 5860" refers to the acronym Request For Comments 5860 and corresponds to a request of the Internet Engineering Task Force (IATF) concerning requirements for Operation, Assistance and Maintenance (OAM) in MPLS transport networks.

As used herein, the term "syntonization" is to be understood to mean frequency synchronization.

The following described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

The embodiments of the present invention refer to one or more agents to be implemented in network nodes equipped with a PTP module. These agents allow for providing an interworking between different network entities and a PTP module within a given network node.

A PTP module refers to a PTP entity which comprises a PTP clock such as an ordinary clock (OC), a boundary clock (BC) or a transparent clock (TC). Indeed, the interworking agent can be seen as an extension of the PTP protocol stack and typically cannot be installed without PTP module.

Figure 1:
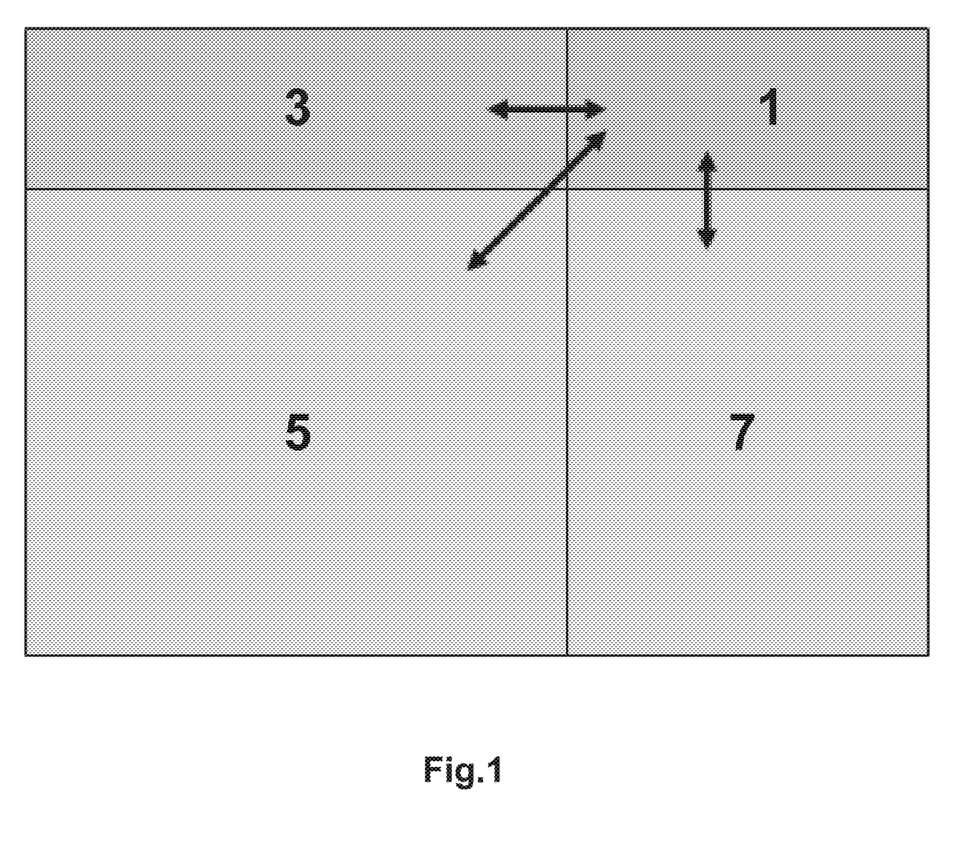
FIG. 1 is an exemplary diagram of different interfaces of an interworking agent according to the embodiments of the present invention.

As described in the example of FIG. 1, the interworking agent 1 has two types of interfaces:
- a PTP-side interface to interact with PTP entities 3 at an application level and
- at least one network-side interface to interact with network entities (an OAM plane 5 or a control plane 7) at a network level.

Thus, the interworking agent can communicate on the one hand with the PTP module and on the other hand with network entities and therefore being a link between both sides/levels that enables to inform of events occurred at one level to the other one, in particular a failure requiring a reconfiguration or a modification of some parameters.

The interactions at the interface types will now be described in details:
the PTP-side interface:
  read functions:
    reading of the PTP clock type (slave, Grand-master, BC or TC) and/or the quality levels as referred by the ITU-T recommendations (G.811, G.812, G.813, Y.1731 . . . ) or by the IEEE 802.1 ag or IEEE 802.3 ah of the local equipment clock;
    reading of different counters from the PTP such as packet loss ratio (detected thanks to PTP packet sequence numbers, packets received in disorder can be considered as lost for most scenarios);
    monitoring of the packet delay variations and of link and network node transit delay values as well as of delay asymmetry values;
  alarm thresholds can be predefined at this interface in order to trigger a PTP "signal failed" alarm when the related counter reaches the threshold;
  Write functions:
    write into the PTP module dataset new path characteristics when a path/route change has been performed;

the network-side interface:
  1) With the network control plane
    It has to be noted that the interface with the control plane can be limited to only signaling functions related to tunnels transporting PTP flows. Exchanges between the agents and towards the control plane can be transmitted for example by Resource Reservation Protocol (RSVP) messages or Resource Reservation Protocol Traffic Engineering (RSVP-TE) or Label Distribution Protocol (LDP) messages.
    Read functions:
      reading the status of the PTP label switch path (LSP) (UP, DOWN, working, protected, etc.);
    Write functions:
      force the working LSP (respectively the protected LSP) status to DOWN (respectively to UP) when a PTP "signal failed" alarm is detected at the PTP module and therefore provoke a path switch (from working to protected and vice versa);
  2) With the data plane
    The interface with the data plane can be limited to tunnels transporting PTP flows
    Read functions:
      reading the status of the tunnels (specified in the Label Switch Path) transporting PTP flows;
    Write Functions:
      forcing path change (LSP from working to protected and vice versa) when a PTP "signal failed" is detected by forcing the related path status to the appropriate value (working path to a standby state and protected path to an active state and vice versa). In the absence of a control plane, Operation, Administration and Maintenance (OAM) messages can be used to propagate the error signal to a remote end;

Thus, the interworking agents can use control plane messages (RSVP-TE or LDP messages) or OAM messages to communicate with each other. As a consequence, the implementation of said interworking agents does not require to set up a new communication protocol.

For a better understanding, different embodiments will now be described.

Figure 2:
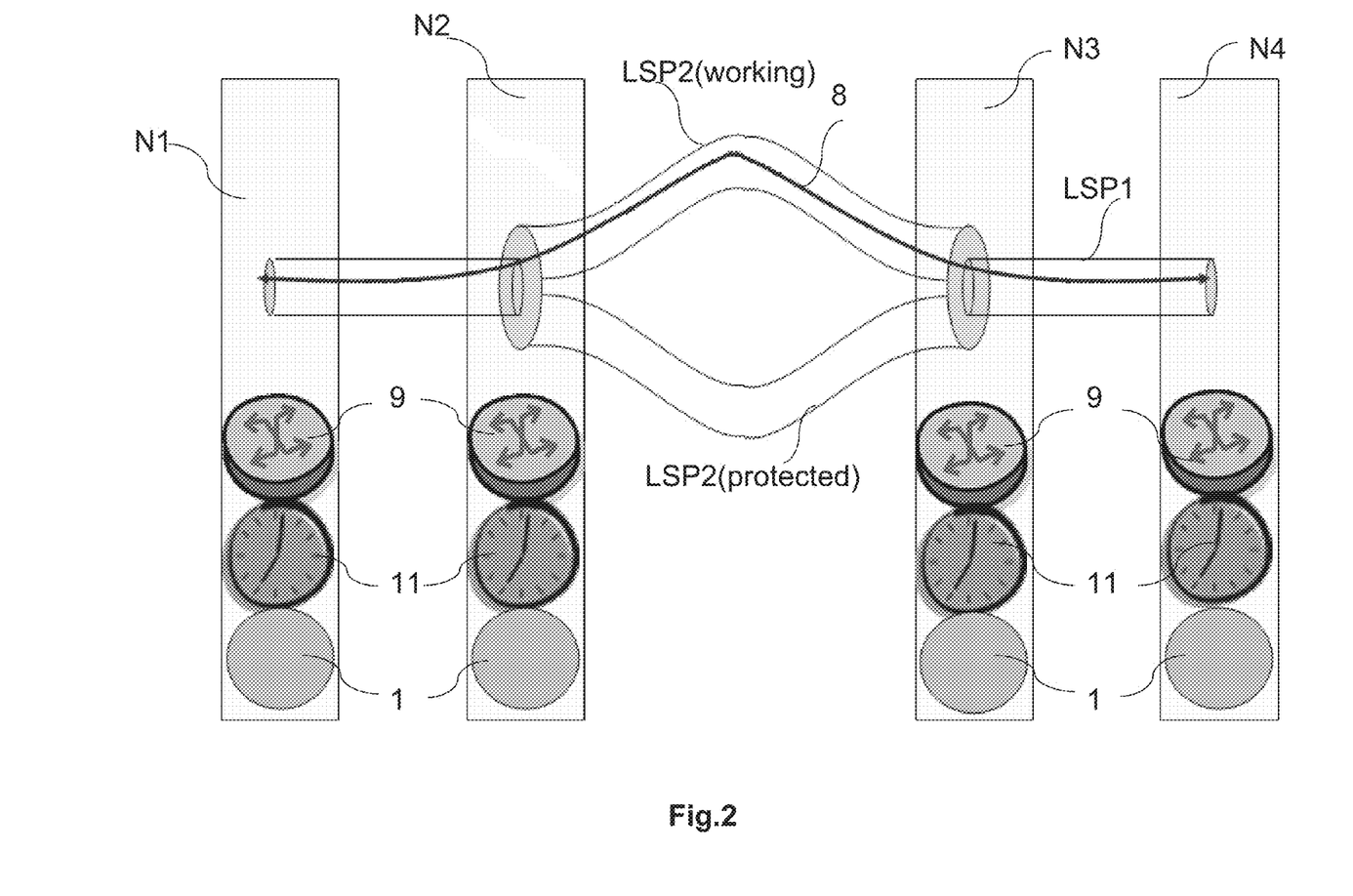
FIG. 2 is an exemplary diagram of a network portion comprising four network nodes equipped with an interworking agent according to an embodiment of the present invention.

In the case presented in FIG. 2, a PTP synchronization flow 8 is transmitted between a node N1 and a node N4 over a Label Switch path LSP1. Said label switch path LSP1 is encapsulated in a second label switch path LSP2 between nodes N2 and N3. This can be the case, for example, when the path followed by the PTP synchronization flow 8 is conveyed across another domain (between nodes N2 and N3). All four nodes comprise a label switch router (LSR) 9, a PTP module 11 and an interworking agent 1, the PTP module 11 of nodes N1 and N4 being respectively the master and the slave clocks and the PTP module 11 of nodes N3 and N4 being transparent clocks. In this embodiment, RSVP-TE messages are used to communicate with the control plane and the RSVP POLICY_DATA object is used to specify the PTP marker element. In such case, the RSVP POLICY_DATA object is used to "mark" the Label Switch Path (LSP) as a PTP LSP at the LSP set up. The idea is therefore to specify a "PTP marker" element within a RSVP-TE message in order to convey said element to the control plane and inform said control plane of the specificity of a PTP LSP.

Figure 3:
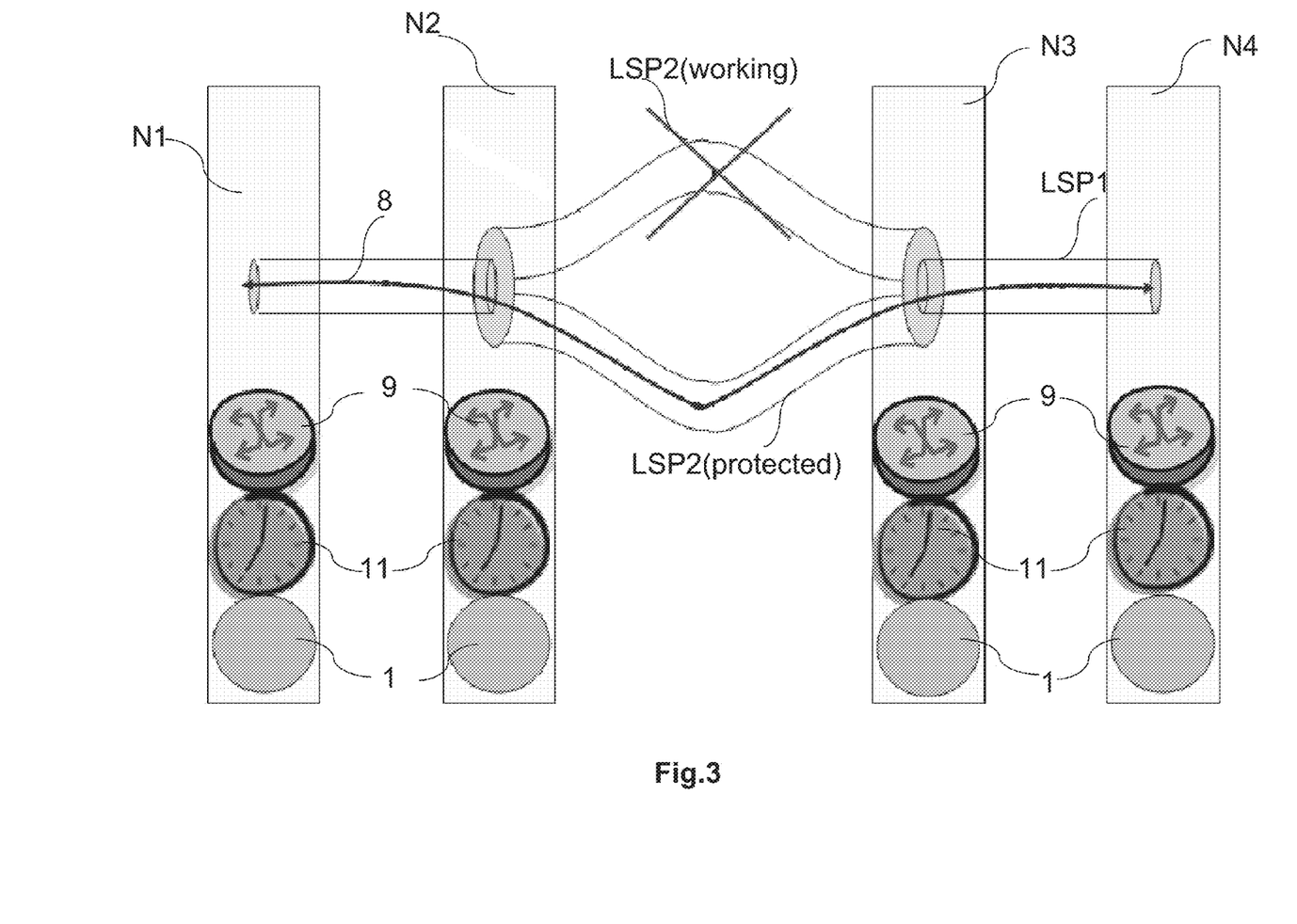
FIG. 3 is an exemplary diagram of the PTP synchronization flow switch to a protected path when a network failure occurs.

In case of failure between nodes N2 and N3, the PTP synchronization flow 8 is switched by the control plane to be transmitted on a LSP2 protected path described on FIG. 3. Such path change is performed at nodes N2 and N3 by the LSR 9. This operation being transparent for nodes N1 and N4 but impacting PTP parameters (such as delay asymmetry), the interworking agents 1 located in nodes N2 and N3 make use of the RSVP-TE POLICY-DATA object to inform the interworking agent 1 located in nodes N1 and N4 of the failure event relative to LSP2 and of the path change. The interworking agents 1 located in nodes N1 and N4 then forward the appropriate information to the PTP modules (master and slave clocks) to update their PTP parameters according to the characteristics of the new path. Thus, thanks to the interworking agent, PTP modules are informed in real-time of the path change by network equipments from a working to a protected LSP between nodes N2 and N3.

Figure 4:
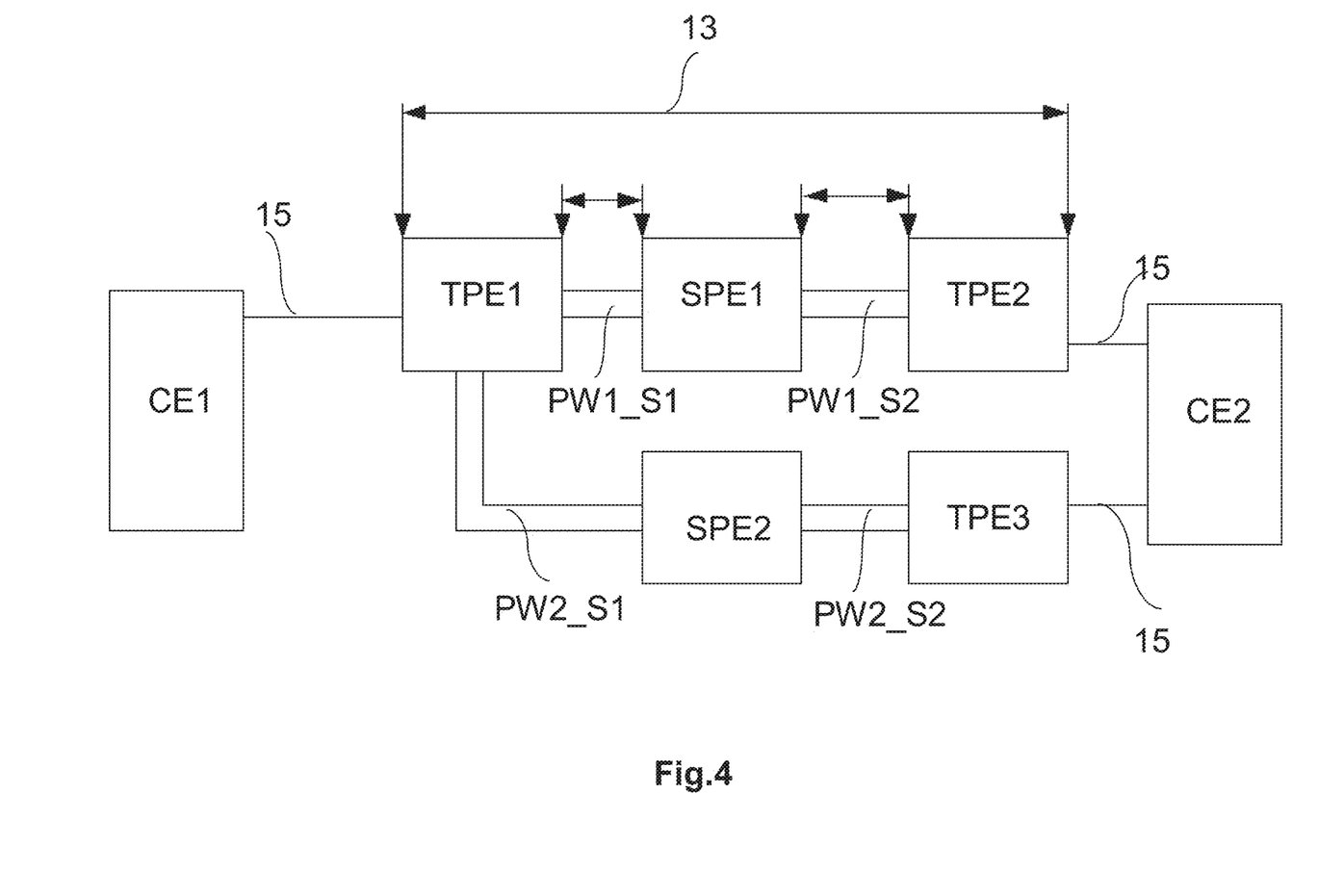
FIG. 4 is an exemplary diagram of a network portion which comprises multisegment pseudo-wire transmissions.

A second embodiment, wherein the PTP synchronization flow is transported over a pseudo-wire (PW) 13 and using a Multiprotocol Label Switching (MPLS) tunnel, is described in FIG. 4. In this configuration, messages exchanged with the control plane are managed by a label distribution protocol (LDP). A customer equipment CE1 comprising a PTP clock is connected to another customer equipment CE2 also comprising a PTP clock via two multi-segment pseudo-wires PW1 and PW2. The connection is made between the Termination Provider Edge TPE1 linked to the customer equipment CE1 by an attachment circuit 15 and Termination Provider Edges TPE2 and TPE3 linked to the customer equipment CE2 by other attachment circuits 15.

Besides, the first segment (PW1_S1 and PW2_S1) of both pseudo-wires correspond to tunnels across a first Packet Switch Network (PSN1) and are switched at switching points SPE1 and SPE2 to a second pseudo-wire segment (PW1_S2 and PW2_S2) which correspond to tunnels across a second Packet Switch Network (PSN2).

Thus, both multi-segment pseudo-wires create a redundancy in the pseudo-wire connection, one pseudo-wire, PW1 for example, being active and one pseudo-wire, PW2 for example, being in a standby mode.

In this case, the interworking agents use the Label Distribution Protocol (LDP) messages to communicate with the pseudo-wire control plane and to detect pseudo-wire switchovers.

In order to know which pseudo-wire is active, the interworking agent reads the "operational status" and the "preferential forwarding status bit" communicated via the status TLV within LDP messages. The interworking agent can also ask the LDP control plane to insert path TLV into LDP signaling messages in order to know exactly the path taken by a multi-segment pseudo-wire. Different network parameters sets (delay variations, one-way delays, etc) related to different pseudo-wire segments can be recorded and updated at the PTP module level or clock level and can be applied accordingly to the path TLV information received by the interworking agent associated with the PTP slave clock (corresponding to CE2 in the present example). The update of these network parameters can be achieved, for example, thanks to the functionalities of the transparent clocks (TC) implemented in the switching points. The value of the parameters can be recorded within a PTP message correction field for peer-to-peer TC as it concerns segment delays or can be communicated to the slave clock making use of a new network parameter TLV as an extension to LDP. Thus, as in the previous example, the interworking agents allow to inform the PTP entities of events occurring on the pseudo-wire connections in order to update the PTP parameters in case of a path change in the pseudo-wire connection.

Moreover, it has to be noted that as the interworking agents interact locally with the other entities (PTP entities and network entities), they are adapted to real-time procedures. Indeed, their local status enables a local interworking of the different entities which enables a real time adaptation of any reconfiguration without requiring central management entities.

Thus, the embodiments of the present invention allow reduction of both the operational expenditures (OPEX) thanks to the automation of the procedures (no need for manual reconfiguration) and the capital expenditures (CAPEX) thanks to a quick recovery time which requires less stable and therefore less expensive slave clocks.

A person of skill in the art would readily recognize that steps of various above-described methods can be performed by programmed computers. Herein, some embodiments are intended to cover program storage devices, e.g., digital storage media, which are machine or computer readable and encode machine-executable or computer-executable programs of instructions where said instructions perform some or all the features of agent described herein. The program storage devices may be, e.g., digital memories magnetic storage media such as magnetic disks or tapes, hard drives, or optically readable digital data storage media. The embodiments are also intended to cover computers programmed to perform said features of agent described above.

What is claimed is:

1. Interworking agent aimed at being installed in a network node comprising a Precision Time Protocol "PTP" module, said agent comprising:
   a synchronization-side interface configured to
      measure Precision Time Protocol "PTP" metrics for detecting a Precision Time Protocol "PTP" signal failure,
      read and modify Precision Time Protocol "PTP" parameters of the Precision Time Protocol "PTP" module,
   at least one network-side interface configured to
      measure network metrics for selecting an optimal path for packet synchronization signals
      monitor network events for detecting a network path change,
      read and modify
         signals exchanged with a network planning entity and,
         signals exchanged between network nodes at a network level in order to communicate with remote interworking agents located in other network nodes,
   the said interworking agent also comprises communication means between the synchronization side interface and the network-side interface to inform one interface of events occurring on the other interface.

2. Interworking agent in accordance with claim 1 wherein the network planning entity is a network control plane and the signals exchanged with the network control plane comprise network control messages.

3. Interworking agent in accordance with claim 2 wherein the network control messages comprise Resource Reservation Protocol "RSVP" or its Traffic Engineering extension "RSVP-TE" signaling messages and wherein at least one field modifiable by an interworking agent network-side interface comprises a POLICY_DATA object.

4. Interworking agent in accordance with claim 2 wherein the network control messages are Label Distribution Protocol "LDP" messages and wherein at least one field modifiable by an interworking agent network-side interface comprises an added network parameter Type Length Value "TLV" as an extension of Label Distribution Protocol "LDP".

5. Interworking agent in accordance with claim 1 wherein the network planning entity is an Operation, Administration and Maintenance "OAM" Plane and the signals exchanged with the OAM plane comprise maintenance signals transmitted at the physical level or at the layer 2 level of the Open Systems Interconnection "OSI" model.

6. Interworking agent in accordance with claim 5 wherein the OAM plane comprises an Ethernet OAM functionality as referred by the IEEE 802.1 ag or IEEE 802.3 ah or ITU-T Y.1731 Recommendations.

7. Interworking agent in accordance with claim 5 wherein the OAM plane comprises a Multiprotocol Label Switching "MPLS" OAM functionality as referred by the Request for Comments "RFC" 5860.

8. Interworking agent in accordance with claim 1 wherein the network planning entity comprises a network management plane.

9. Interworking agent in accordance with claim 1, wherein the Precision Time Protocol "PTP" metrics comprise:
Packet Delay Variation (PDV) values and/or,
link and Network node transit delay values and delay asymmetry values and/or,
ITU-T G.781 Quality Levels of the local equipment clock and/or,
values identifying an IEEE 1588 V2 Transparent Clock, an IEEE 1588 V2 Boundary Clock or a physical layer based syntonization support such as the ITU-T synchronous Ethernet or SONET/SDH technologies.

10. Interworking agent in accordance with claim 1, wherein the Precision Time Protocol "PTP" module comprises an IEEE 1588 V2 transparent clock or an IEEE 1588 V2 boundary clock or an IEEE 1588 V2 ordinary clock.

11. Interworking agent in accordance with claim 1, wherein a Precision Time Protocol "PTP" signal failure corresponds to a degradation of the Precision Time Protocol "PTP" flow characteristics above a predefined threshold during a predefined observation duration so that a targeted synchronization performance cannot be achieved.

12. Network node comprising
a Precision Time Protocol "PTP" module and,
an interworking agent, said interworking agent comprising:
a synchronization-side interface configured to
measure Precision Time Protocol "PTP" metrics for detecting a Precision Time Protocol "PTP" signal failure,
read and modify Precision Time Protocol "PTP" parameters of the Precision Time Protocol "PTP" module,
at least one network-side interface configured to
measure network metrics for selecting an optimal network path for synchronization signal,
monitor network events for detecting a network path change,
read and modify
signals exchanged with a network planning entity and,
signals exchanged between network nodes at a network level in order to communicate with remote interworking agents located in other network nodes.

13. Network comprising a plurality of nodes, at least some of the said nodes comprising
a Precision Time Protocol "PTP" module and,
an interworking agent, said interworking agent comprising:
a synchronization-side interface configured to
measure Precision Time Protocol "PTP" metrics for detecting a Precision Time Protocol "PTP" signal failure,
read and modify Precision Time Protocol "PTP" parameters of the Precision Time Protocol "PTP" module,
at least one network-side interface configured to
measure network metrics for selecting an optimal network path for packet synchronization signals,
monitor network events for detecting a network path change,
read and modify
signals exchanged with a network planning entity and,
signals exchanged between network nodes at a network level in order to communicate with remote interworking agents located in other network nodes.

14. Method for reconfiguring and supporting time distribution in a network using a Precision Time Protocol "PTP" using interworking agents implemented in network nodes comprising a Precision Time Protocol "PTP" module, said interworking agents comprising:
a synchronization-side interface configured to
measure Precision Time Protocol "PTP" metrics for detecting a Precision Time Protocol "PTP" signal failure,
read and modify Precision Time Protocol "PTP" parameters of the Precision Time Protocol "PTP" module,
at least one network-side interface configured to
measure network metrics for selecting an optimal path for packet synchronization signals,
monitor network events for detecting a network path change,
read and modify
signals exchanged with a network planning entity and,
signals exchanged between network nodes at a network level in order to communicate with remote interworking agents located in other network nodes
wherein,
in case of detection of a Precision Time Protocol "PTP" signal failure, signals exchanged with a network planning entity are modified to inform said network planning entity of a Precision Time Protocol "PTP" signal failure in order to trigger an automatic path change of a Precision Time Protocol "PTP" flow from a current working path to a protected path and,
in case of a detection of a path change,
signals exchanged between network nodes are modified to inform remote interworking agents located in other network nodes along a Precision Time Protocol "PTP" time distribution chain of a new Precision Time Protocol "PTP" parameters corresponding to the protected path, said new parameters being then communicated by said remote interworking agents to their local Precision Time Protocol "PTP" module.

* * * * *